Nov. 5, 1957  J. M. CAMPOS  2,812,080
VEHICLE BEDS
Filed Feb. 6, 1956  3 Sheets-Sheet 1
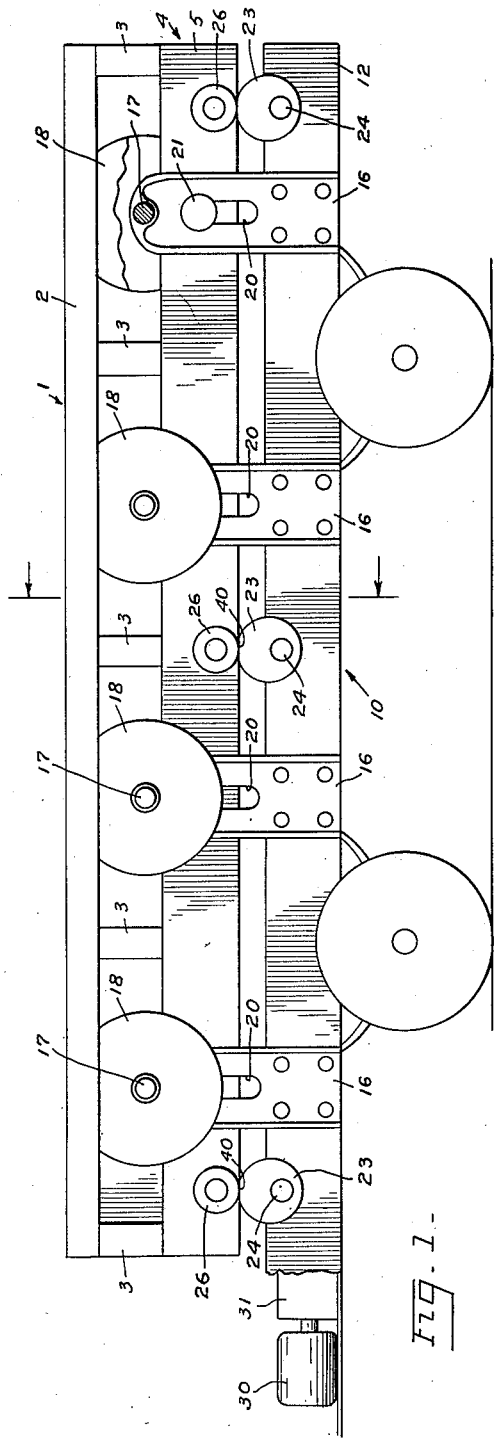
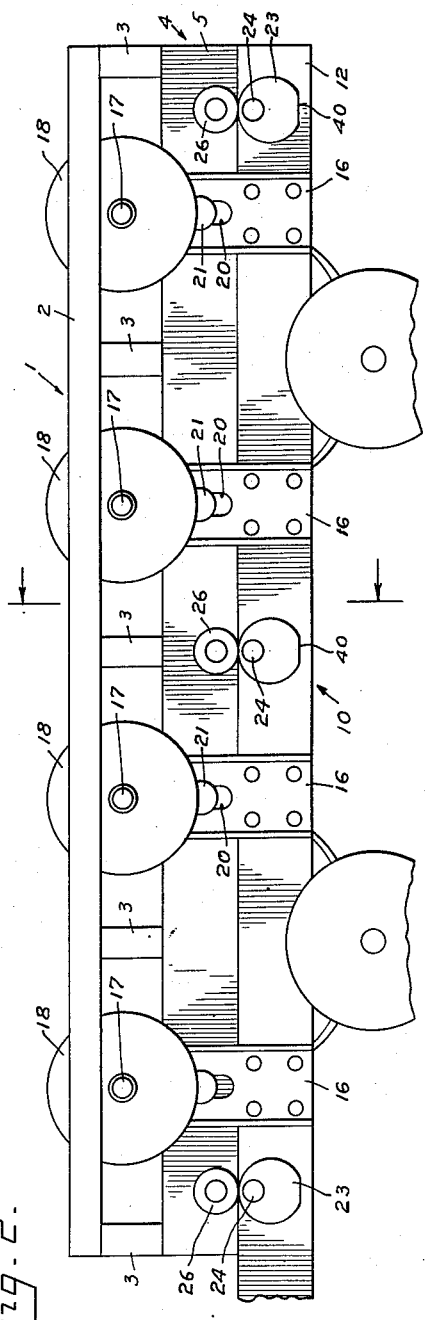
INVENTOR.
JOSE M. CAMPOS
BY Alexander Riaboff
ATTORNEY

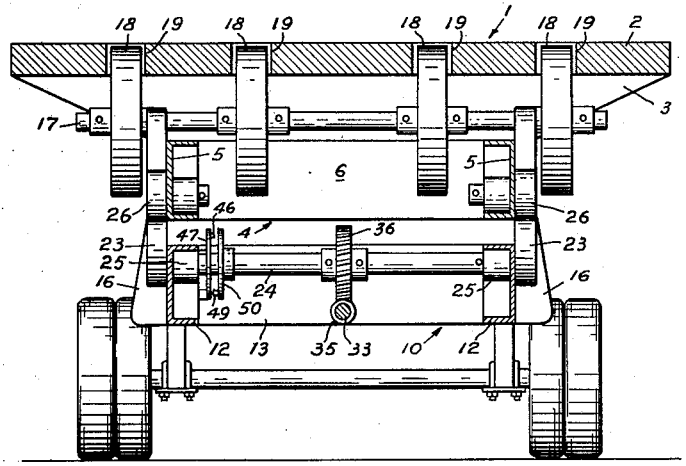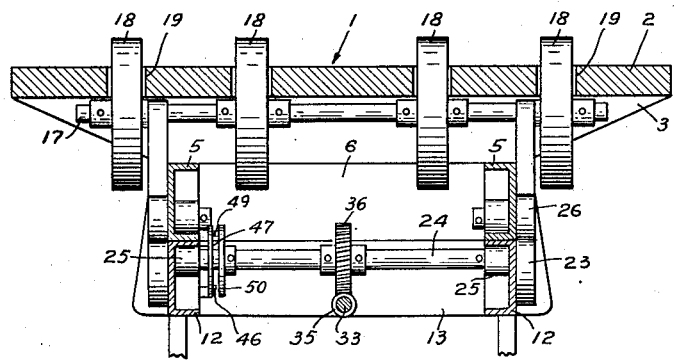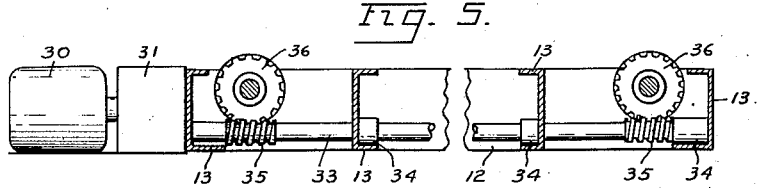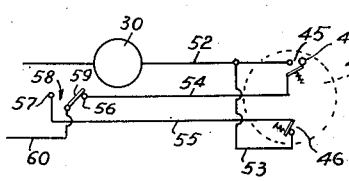

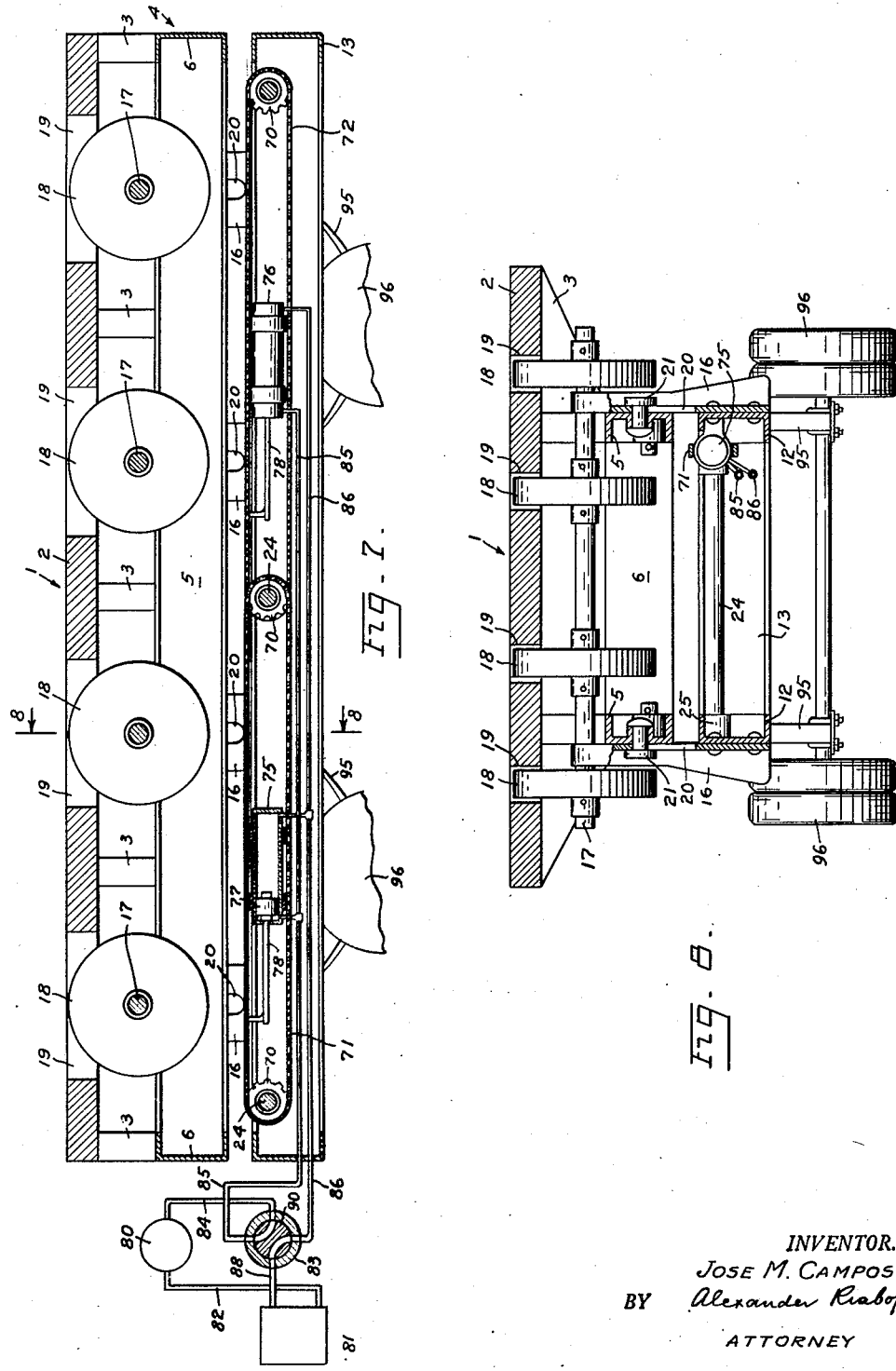
Nov. 5, 1957 — J. M. CAMPOS — 2,812,080
VEHICLE BEDS
Filed Feb. 6, 1956 — 3 Sheets-Sheet 3
INVENTOR.
JOSE M. CAMPOS
BY Alexander Riaboff
ATTORNEY United States Patent Office 2,812,080
Patented Nov. 5, 1957

2,812,080
VEHICLE BEDS
Jose M. Campos, San Salvador, El Salvador, Central America
Application February 6, 1956, Serial No. 563,782
3 Claims. (Cl. 214—84)

This invention relates to an improvement in a vehicle bed.

The object of this invention is to provide a vehicle bed and means associated therewith for facilitating the loading and unloading of said vehicle.

Another object of this invention is to provide a vehicle bed and a plurality of rollers carried by said vehicle, said bed having a plurality of openings therein, and being movable downwardly to expose portions of said rollers above said bed for facilitating the loading and unloading of said vehicle, said bed being also movable upwardly above the rollers to provide a solid support for the load.

Other objects and advantages will appear as the specification proceeds and the novel features of the device will be particularly pointed out in the claims hereto annexed.

In this specification and the annexed drawing, the invention is illustrated in the form considered to be the best but it is understood, that the invention is not limited to such form; and it is also to be understood that in and by the claims following the description, it is desired to cover the invention in whatsoever form it may be embodied.

In the drawings:

Fig. 1 is a side elevation of a vehicle, partly in section, showing its bed structure in elevated position.

Fig. 2 is a side elevation of a vehicle showing its bed structure in lowered position.

Fig. 3 is a vertical cross-section of Fig. 1 along the line 3—3.

Fig. 4 is a vertical cross-section of Fig. 2 along the line 4—4.

Fig. 5 is a diagrammatic view of an electrically operated mechanism for raising and lowering the bed structure.

Fig. 6 is an electric wiring diagram of the mechanisms shown in Fig. 5.

Fig. 7 is a longitudinal vertical cross-section of a vehicle, showing diagrammatically an hydraulic mechanism for raising and lowering the bed; and Fig. 8 is a cross-section along the line 7—7 of Fig. 7.

My invention is shown in the drawings and described in the specification as applied to a vehicle, such as a truck, a trailer, or other vehicle for moving heavy loads.

A vehicle constructed in accordance with the teachings of this invention consists of a movable bed structure 1 having a flat bed 2 supported by a plurality of posts 3 secured to a bed frame 4. The latter includes two longitudinal parallel channels 5 interconnected by a plurality of cross-members 6.

The bed structure 1 is supported on a vehicle frame 10. The latter consists of a pair of parallel longitudinal beams 12 connected by a plurality of cross-members 13. When the bed structure is in the downward position, the channels 5 rest directly on the beams 12 as shown in Figs. 2 and 4.

The vehicle frame 10 is provided with a plurality of heavy brackets 16, symmetrically secured to the beams 12 by rivets or the like. The brackets 16 extend upwardly above said beams 12 and carry at their tops axles 17 extending across said frame 10 under the bed 2. Each of said axles carries a plurality of load rollers 18. The number of the rollers 18 on each axle 17 and the number of said axles may vary according to the purpose for which a vehicle is intended to be used.

The bed 2 is provided with a plurality of elongated openings 19 aligned with said rollers 18 through which the tops of said rollers pass when the bed 2 is lowered, as hereinafter described in detail.

Each bracket 16 is also provided with a central longitudinal slot 20 through which passes a pin 21 secured to the channel 5. The brackets 16 and the pins 21 keep the box structure 1 and the vehicle frame 10 in constant vertical alignment. Whenever the bed structure 1 is raised as shown in Fig. 1, the upper surface of the bed 2 is elevated above the load rollers 18, thus permitting a load to rest directly on the bed 2. Whenever the bed structure 1 is lowered as shown in Fig. 2, the tops of the load rollers 18 are exposed above the upper surface of the bed 2 and are ready to support a load thereon, thus permitting the load to be easily slid onto or off the vehicle bed 2.

Various means may be employed for the purpose of raising and lowering the bed structure 1 in relation to the vehicle frame 10. I have shown a plurality of eccentrics 23 secured to the ends of the shafts 24 arranged transversely in the vehicle frame 10 and rotatably supported in the bearings 25 carried in the beams 12. Each of said eccentrics 23, when rotated, pushes a bed roller 26 rotatably secured to one of the channels 5 in alignment with a corresponding eccentric 23.

Various means may be employed for rotating said eccentrics 23, such as an electric means shown in Figs. 1–6, or an hydraulic means shown in Figs. 7 and 8.

The electric means for rotating the eccentrics 23 consists of an electric motor 30, connected to some source of electric current, such as a battery, not shown in the drawings. The motor 30 is operatively connected with a speed reduction box 31, wherein the speed of rotation of the motor 30 is very considerably reduced, so that a shaft 33 operatively connected with said box rotates at a comparatively slow rate of speed. The shaft 33 extends the length of the vehicle body and passes through several bearings 34 provided in the cross-members 13, and carries a plurality of worms 35 which mesh with worm gears 36 carried on the eccentric shafts 24. By rotating the shafts 24 in the same direction 180°, the eccentrics 23 are brought into two diametrically different positions by which the bed structure 1 is either raised or lowered. The eccentrics 23 have a flattened portion 40 which facilitates the support of the bed rollers thereon.

An automatic means may be provided for stopping the electric motor 30 when said eccentrics complete the 180° turn, such as a pair of spring pressed switches 45 and 46 secured to a bracket 47, welded to the beam 12, said switches being 180° apart and actuated by a pin 49 carried by a disc 50 secured to one of the shafts 24. A wire 52 connects the motor 30 with the switch 45 and connects the motor 30 with the switch 45 and a wire 53 connects the wire 52 with the switch 46. Both of said switches 45 and 46 are connected by wires 54 and 55 respectively with the poles 56 and 57 of a main double break switch 58, the throw knife 59 of which is connected by a wire 60 with the source of current.

Fig. 6 shows the switch 45 disconnected by the action of the pin 47, thereby interrupting a circuit consisting of the motor 30, wire 52, switch 45, wire 54, main switch 58, thus stopping the motor 30. If the throw knife 59 is switched to the contact 57, the current will run through the wire 52, wire 53, switch 46, wire 55 and main switch 58, thus operating the motor 30. The pin 49 will continue to move and will slide off the switch 45 which is again closed by the action of its spring. The motor 30 will continue to run until the pin 47 will discontinue the switch 46, thus stopping said motor again. Each time the shafts 24 with the eccentrics 23 will be rotated 180°, thus raising or lowering the bed structure 1.

An hydraulic means for rotating the eccentrics 23 are shown in Figs. 7 and 8 and include sprockets 70 secured to the front, central and rear shafts 24, the front and central shaft sprockets being connected by a chain 71 and the central and rear shaft sprockets being connected by a chain 72. Preferably two hydraulic cylinders 75 and 76 secured to the frame 10 are provided to operate the chains 71 and 72 respectively. Each of said cylinders has a piston 77 from which a piston rod 78 extends forwardly. The free ends of said rods are secured to said chains 71 and 72. Any fluid may be used for operating said pistons 77. Fig. 7 shows a pump 80 connected to a storage tank 81 by a pipe 82 and to a four way valve 83 by a pipe 84. The valve 83 is connected to the front end of each of said cylinders by a pipe 85 and to the rear end of each of said cylinders by a pipe 86. The pipe 88 connects the valve 83 with the storage tank 81.

When the valve 83 is in a position shown in Fig. 7, the pump 80 forces the fluid in to the pipe 84, through the valve 83 into the pipe 85 and into the front part of each of the cylinders 75 and 76, thus moving the pistons 77 toward the rear part of said cylinders. The displaced fluid from the rear portion of the cylinder is directed into the pipe 86, through the valve 83, the pipe 88 into the storage tank 81. The rearward motion of the pistons 77 is stopped by the end walls of the cylinders 75 and 76.

If the core 90 of the valve 83 is rotated 90° in a clockwise direction, the pipe 86 is brought in communication with the pump 80 and the pipe 85 with the storage tank 81. The pressure of the fluid created by the pump 80 will force the pistons 77 forward and move the chains 71 and 72 in the opposite direction, thus rotating the shafts 24 180°.

The vehicle is provided with ordinary springs 95 and wheels 96.

The operation of the device is as follows: The bed structure 1 is lowered before loading and the tops of the load rollers 18 are exposed. The articles to be loaded are slid on said rollers in desired positions. When the loading is finished, the bed structure 1 is raised and the loaded articles rest on the bed 2. In order to unload, the bed structure 1 is lowered again and the articles are slid on said load rollers off the bed 2.

I claim:

1. The combination of a load carrying vehicle having a frame with a means for facilitating the loading and unloading of said vehicle comprising a bed slidably arranged above said frame, said bed having a plurality of openings therein; a plurality of freely rotating load rollers carried by said frame under said bed, each of the load rollers being located under a corresponding opening in the bed, means for lowering and raising said bed including a plurality of eccentric shafts carried by the frame, a plurality of eccentrics secured to said shafts, a plurality of bed rollers carried by said bed, said eccentrics being arranged under said bed rollers for lifting and lowering said bed; means for rotating said eccentrics including an hydraulically operated cylinder attached to said frame, a piston slidably carried by said cylinder, a rod carried by said piston; a sprocket secured to each eccentric shaft, a chain operatively connecting said sprockets, and means connecting said rod with said chain.

2. The combination of a load carrying vehicle having a frame with a means for facilitating the loading and unloading of said vehicle comprising a bed slidably arranged above said frame, said bed having a plurality of openings therein; a plurality of freely rotating load rollers carried by said frame under said bed, each of the load rollers being located under a corresponding opening in the bed, means for lowering and raising said bed including a plurality of eccentric shafts carried by the frame, a plurality of eccentrics secured to said shafts, a plurality of bed rollers carried by said bed, said eccentric being arranged under said bed rollers for lifting and lowering said bed; means for rotating said eccentrics including an electric motor, a shaft operatively connected to said motor and extending longitudinally under said bed, a plurality of worms on said motor shaft, a worm gear carried by each of said eccentric shafts and meshing with a corresponding worm and a control means for rotating said eccentrics 180° during each operation of said motor.

3. The combination of a load carrying vehicle having a frame with means for facilitating the loading and unloading of said vehicle comprising a plurality of brackets secured to said frame, a plurality of axles carried by said brackets, a plurality of load carrying rollers carried by each of said axles, a bed normally disposed above said rollers and having a plurality of openings therein, each opening being located above a corresponding roller, each bracket having a longitudinal slot therein, means attached to said bed and slidable in said slots for preventing longitudinal displacement of said bed in relation to said frame, and means for raising said bed above said rollers, and for lowering said bed to expose the top portions of said rollers above said bed.

References Cited in the file of this patent

UNITED STATES PATENTS

| | | |
|---|---|---|
| 2,176,636 | Meacham | Oct. 17, 1939 |
| 2,179,047 | McMurry | Nov. 7, 1939 |
| 2,360,133 | Houssiere | Oct. 10, 1944 |
| 2,411,133 | Hill | Nov. 12, 1946 |
| 2,524,664 | Henderson et al. | Oct. 3, 1950 |
| 2,693,286 | Cocks | Nov. 2, 1954 |